(12) United States Patent
Choi et al.

(10) Patent No.: US 9,800,924 B2
(45) Date of Patent: *Oct. 24, 2017

(54) METHOD OF PROVIDING EXTERNAL DEVICE LIST AND IMAGE DISPLAY DEVICE

(71) Applicant: LG ELECTRONICS INC., Seoul (KR)

(72) Inventors: Jinyoung Choi, Seoul (KR); Gowoon Choi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/390,198

(22) Filed: Dec. 23, 2016

(65) Prior Publication Data

US 2017/0111697 A1    Apr. 20, 2017

Related U.S. Application Data

(63) Continuation of application No. 13/535,735, filed on Jun. 28, 2012, now Pat. No. 9,532,102.

(30) Foreign Application Priority Data

Sep. 2, 2011   (KR) .................. 10-2011-0088863

(51) Int. Cl.
*H04N 5/445*   (2011.01)
*H04N 21/436*  (2011.01)
(Continued)

(52) U.S. Cl.
CPC . *H04N 21/43615* (2013.01); *H04N 21/42222* (2013.01); *H04N 21/4622* (2013.01);
(Continued)

(58) Field of Classification Search
CPC .. H04N 5/45; H04N 5/44591; H04N 21/4316; H04N 7/0806
(Continued)

(56) References Cited

U.S. PATENT DOCUMENTS 6,825,858 B2 * 11/2004 Sato ................. H04L 29/06
                                                     348/552
8,630,681 B2    1/2014 Kim
(Continued)

FOREIGN PATENT DOCUMENTS

JP      2006-295236 A      10/2006
KR    10-2010-0058334 A     6/2010
(Continued)

OTHER PUBLICATIONS

Chinese Office Action and Search Report dated Jun. 15, 2015, issued in Application No. 201210232378.5.
(Continued)

*Primary Examiner* — Paulos M Natnael
*Assistant Examiner* — Omer Khalid
(74) *Attorney, Agent, or Firm* — Birch, Stewart, Kolasch & Birch, LLP

(57) ABSTRACT

An image display device including a display; a first external interface configured to receive a first image signal input from a first external device connected to the image display device; a second external interface configured to receive a second image signal input from a second external device connected to the image display device; and a controller coupled with the display, the first external interface and the second external interface. The controller is configured to display a plurality of external device icons on the display, wherein the plurality of external device icons include a first external device icon corresponding to the first external device and a second external device icon corresponding the
(Continued)

second external device, wherein a first default image is displayed on the first external device icon and a second default image is displayed on the second external device icon, display the first default image if the first external device is not connected to the image display device, change the first default image to a first image based on the first image signal in response to the first external device icon being selected if the first external device is connected to the image display device, display the second default image if the second external device is not connected to the image display device, and change the second default image to a second image based on the second image signal in response to the second external device icon being selected if the second external device is connected to the image display device.

12 Claims, 16 Drawing Sheets

(51) Int. Cl.
- *H04N 21/422* (2011.01)
- *H04N 21/462* (2011.01)
- *H04N 7/08* (2006.01)
- *H04N 5/45* (2011.01)

(52) U.S. Cl.
CPC ........ *H04N 5/44591* (2013.01); *H04N 5/45* (2013.01); *H04N 7/0806* (2013.01)

(58) Field of Classification Search
USPC ............ 348/563, 734, 565, 588, 584, 706; 725/38, 40, 43, 48, 59; 345/158; 307/38
See application file for complete search history.

(56) References Cited

U.S. PATENT DOCUMENTS

| | | | |
|---|---|---|---|
| 2003/0075983 A1* | 4/2003 | Stecyk | H04L 12/2805 307/38 |
| 2006/0064733 A1 | 3/2006 | Norton et al. | |
| 2011/0040856 A1 | 2/2011 | Dugan et al. | |
| 2011/0055865 A1 | 3/2011 | Jung | |
| 2011/0109729 A1 | 5/2011 | Yoo et al. | |
| 2011/0126237 A1* | 5/2011 | Lee | H04N 21/4312 725/46 |
| 2011/0131610 A1 | 6/2011 | Lee et al. | |
| 2012/0050267 A1 | 3/2012 | Seo | |

FOREIGN PATENT DOCUMENTS

| | | |
|---|---|---|
| KR | 10-2010-0083641 A | 7/2010 |
| WO | WO 2009/088952 A1 | 7/2009 |

OTHER PUBLICATIONS

Chinese Office Action and Search Report dated Nov. 2, 2014, issued in Application No. 201210232378.5.
European Office Action dated Nov. 19, 2014, issued in Application No. 12172647.5.
European Search Report dated Dec. 21, 2012, issued in Application No. 12172647.5.
Korean Office Action dated Sep. 17, 2012, issued in Application No. 10-2011-0088863.

* cited by examiner

METHOD OF PROVIDING EXTERNAL DEVICE LIST AND IMAGE DISPLAY DEVICE

CROSS-REFERENCE TO RELATED APPLICATIONS

This application is a Continuation of co-pending application Ser. No. 13/535,735, filed on Jun. 28, 2012, which claims priority under 35 U.S.C. §119(a) and 35 U.S.C. §365 to Application No. 10-2011-0088863, filed in Republic of Korea on Sep. 2, 2011, all of which are hereby expressly incorporated by reference into the present application.

BACKGROUND

The present invention relates to an image display device, and more particularly, to a method for providing a list of external devices thereof.

Recently, digital TV services using a wire or wireless communication network are becoming more common. The digital TV services provide various services that typical analog broadcasting services cannot provide.

For example, an Internet Protocol Television (IPTV) service (i.e., one type of the digital TV services) provides interaction through which a user may actively select kinds of watching programs and watching time. The IPTV service may provide various additional services such as internet search, home shopping, and online game on the basis of the interaction.

SUMMARY

Embodiments provide a method of providing an external device list, which allows a user to recognize an input switch in advance before an image signal of an external device, which is applied to an image display device, is switched for input, and an image display device thereof.

In one embodiment, a method of providing an external device list to an image display device includes: displaying a plurality of external device icons connectable to the image display device; positioning a pointer on a first external device icon among the plurality of external device icons; and displaying on a screen of the image display device an image signal of an external device corresponding to the first external device icon having the pointer thereon.

In another embodiment, an image display device includes: a display unit displaying a plurality of external device icons connectable to the image display device; and a control unit performing a control to display an image signal of an external device corresponding to a first external device icon having a pointer thereon when the pointer is positioned on the first external device icon among the plurality of external device icons.

The details of one or more embodiments are set forth in the accompanying drawings and the description below. Other features will be apparent from the description and drawings, and from the claims.

DETAILED DESCRIPTION OF THE EMBODIMENTS

Hereinafter, a method for providing an external device list and an image display device thereof will be described in more detail with reference to the accompanying drawings.

The image display device as an intelligent image display device having a computer supporting function in addition to a broadcasting receiving function further includes an internet function besides a solid broadcasting receiving function so that it may have an easy to use interface such as a handwriting input device, a touch screen, or a space remote controller. Moreover, after accessing internet and a computer with a wire or wireless internet supporting function, a function for e-mail, web browsing, banking, or game may be available. For such various functions, a standardized general OS may be used.

Accordingly, the image display device according to an embodiment may perform user-friendly various functions because a variety of applications may be freely added or deleted on a general OS kernel. The image display device may be a network TV, HBBTV, and a smart TV, for a specific example, and may be applied to a smart phone, if necessary.

Furthermore, although embodiments of the present invention will be described with reference to the accompanying drawings and contents therein, the present invention is not limited thereto.

The terms used in this specification are selected from currently widely used general terms in consideration of functions of the present invention, but may vary according to the intentions or practices of those skilled in the art or the advent of new technology. Additionally, in certain cases, there may be terms that an applicant may arbitrarily select, and in this case, their meanings are described below. Accordingly, the Willis used in this specification should be interpreted on the basis of substantial implications that the terms have and the contents across this specification not the simple names of the terms FIG. 1 is a view illustrating a configuration of a broadcasting system, that is, a schematic view illustrating an entire broadcasting system including an image display device according to an embodiment.

Figure 1:
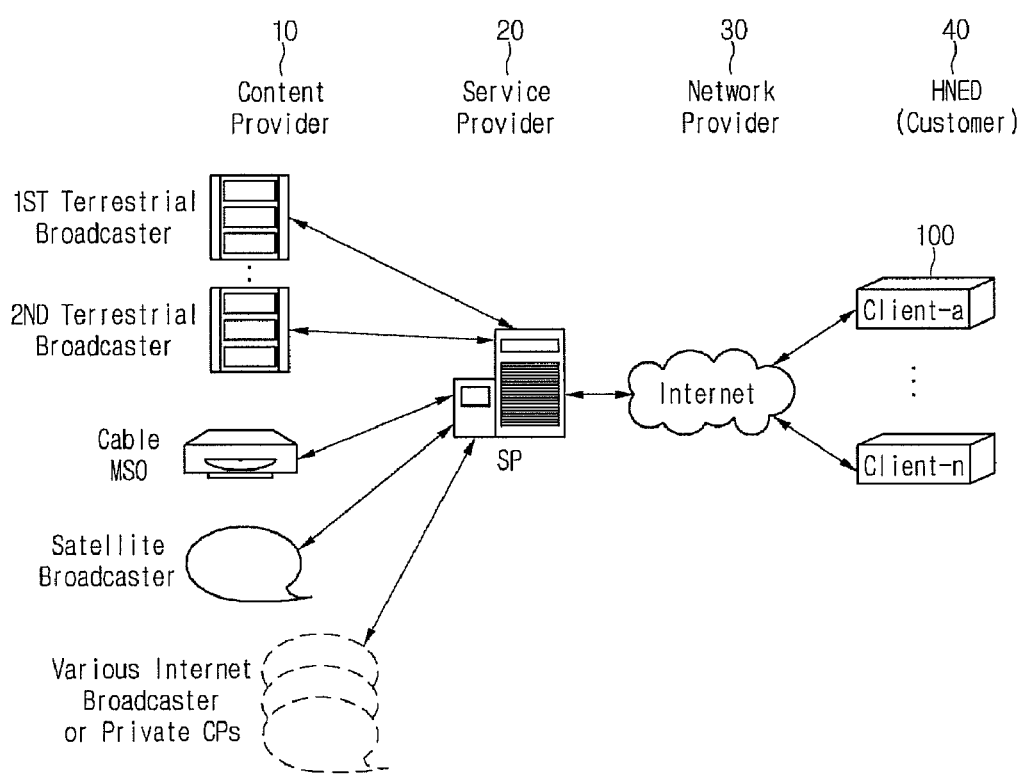
FIG. 1 is a view illustrating a configuration of a broadcast system according to an embodiment.

Referring to FIG. 1, the broadcasting system includes a Content Provider (CP) 10, a Service Provider (SP) 20, a Network Provider (NP) 30 and a Home Network End User (HNED) 40.

The HNED 40 may correspond to a client 100, i.e., the image display device according to an embodiment, and for example, the client 100 may be a network TV, a smart TV, and an IPTV.

Moreover, the CP 10 manufactures and provides various contents. As shown in FIG. 1, the CP 10 may be a terrestrial broadcaster, a cable System Operator (SO), a Multiple System Operator (MSO), a satellite broadcaster, or an Internet broadcaster.

Additionally, the CP 10 may provide various applications besides the broadcast contents. This will be described in more detail later.

The SP 20 may package contents that the CP 10 provides, and provides the packaged contents as services. For example, the SP 20 may package first terrestrial broadcast, second terrestrial broadcast, cable MSO, satellite broadcast, various internet broadcasts, and applications, and then, provide them to a user.

Moreover, the SP 20 may provide services to the client 100 through a unicast or multicast method.

The unicast method is a 1:1 data transmission method between one transmitter and one receiver. For example, in the case of the unicast method, when a receiver requests data to a server, the server transmits the requested data to the receiver in response to the request.

The multicast method is to transmit data to a plurality of receivers in a specific group. For example, a server may transmit data to a plurality of pre-registered receivers simultaneously. In order for such a multicast registration, an Internet Group Management Protocol (IGMP) may be used.

The NP 30 may provide a network to provide the service to the client 100, and the client 100 may establish a Home Network End User (HNED) to receive the service.

Conditional Access or Content Protection may be used as a means to protect contents transmitted from the system. As examples of the Conditional Access or Content Protection, methods such as CableCARD and Downloadable Conditional Access System (DCAS) may be used.

Moreover, it is possible for the client 100 to provide contents via a network. In this case, the client 100 may become a CP, and the CP 10 may receive contents from the client 100. Accordingly, a bidirectional contents service or data service may be available.

According to an embodiment, the CP 10 may provide a network service such as a Social Network Site (SNS), a blog, a micro blog, or an instant messenger.

For example, the CP 10 providing the SNS service may include a server (not shown) storing various kinds of contents such as texts or uploaded images that a plurality of users create in the SNS.

In more detail, a user accesses the server of the CP 10 providing the SNS service by using an image display device, and designates accounts that the user wants, so that the user may confirm messages created by the plurality of the designated accounts.

Additionally, if a user requests the SNS service, an image display device, i.e., the client 100, accesses the server of the CP 10 in order to receive the messages of the designated accounts, and then, displays the received messages sequentially in order of a corresponding message created, for example, displays them in a top to bottom direction.

Figure 2:
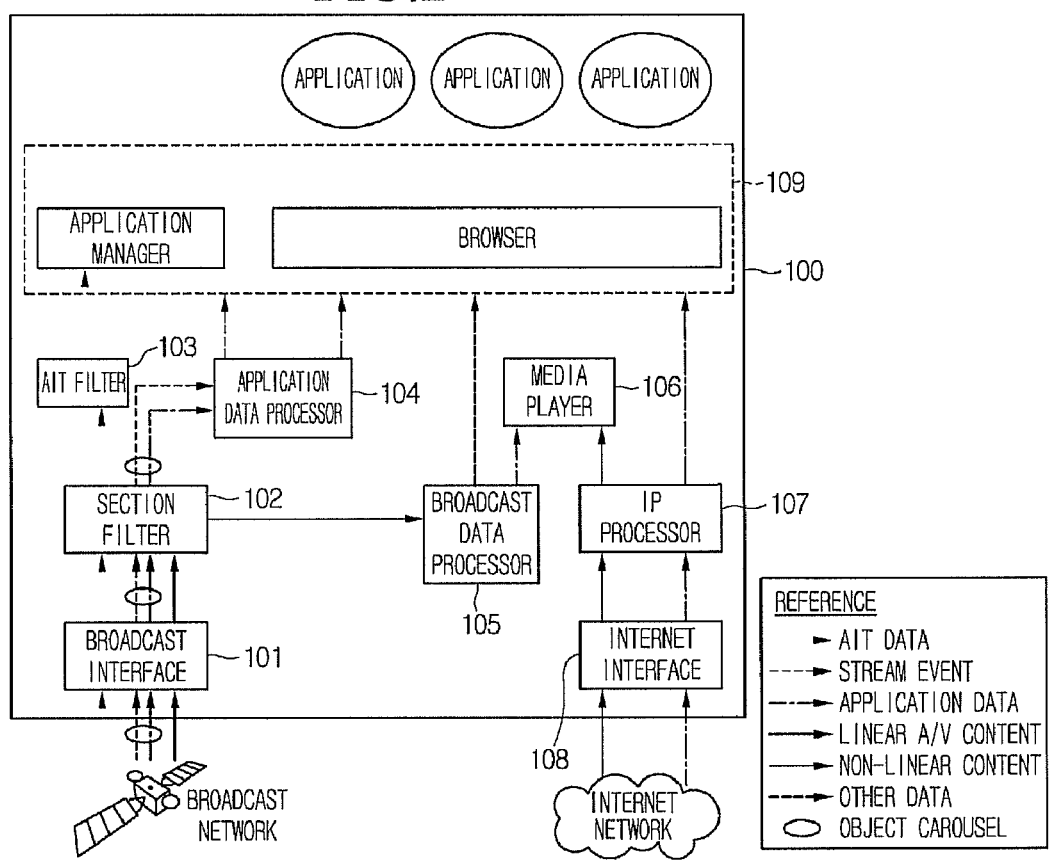
FIG. 2 is a view illustrating a configuration of a broadcast system according to another embodiment.

Referring to FIG. 2, the image display device 100 corresponding to the client of FIG. 1 may be connected to a broadcasting network and internet network.

For example, the image display device 100 may include a broadcast interface 101, a section filter 102, an AIT filter 103, an application data processor 104, a broadcast data processor 105, a media player 106, an internet protocol processor 107, an internet interface 108, and a runtime module 109.

Moreover, the broadcast interface 101 of the image display device 100 may receive Application Information Table (AIT) data, real time broadcast content, application data or a stream event. The real time broadcast content may be Linear A/V Content.

The section filter 102 performs section filtering on four data received through the broadcast interface 101 in order to transmit AIT data into the AIT filter 102, linear A/V content into the broadcast data processor 105, and stream event and application data into the application data processor 104.

The internet interface 108 may receive Non-Linear A/V content and application data. For example, the Non-Linear A/V content may be Content On Demand (COD) application.

Furthermore, the Non-Linear A/V content may be transmitted to the media player 106, and the application data may be transmitted to the runtime module 109.

Additionally, the runtime module 109 may include an application manager and a browser. The application manager may control a life cycle on interactive application by using AIT data, and the browser may display and process the interactive application FIG. 3 is a view illustrating a method for transmitting/receiving data between an image display device and a SP according to an embodiment.

Figure 3:
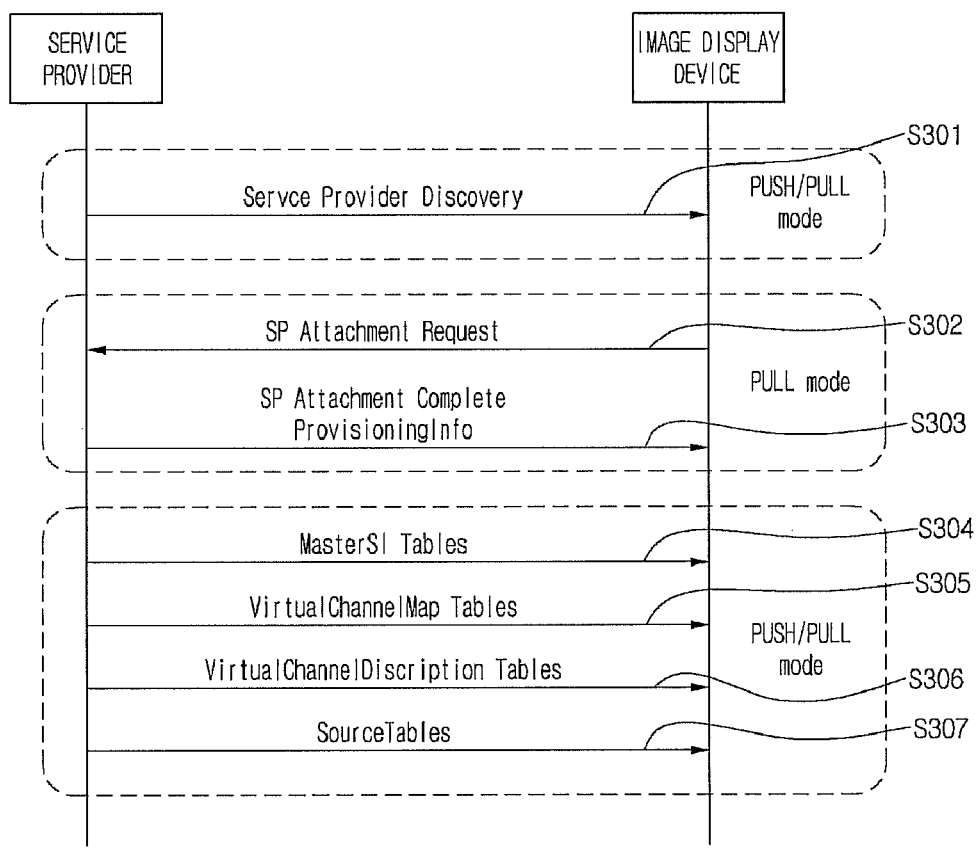
FIG. 3 is a view illustrating a method for transmitting/receiving data between an image display device and a service provider according to an embodiment.

Referring to FIG. 3, the SP performs a service provider discovery operation in operation S301. The image display device transmits a SP Attachment Request signal in operation S302. Once the SP attachment is completed, the image display device receives provisioning information in operation S303. Furthermore, the image display device receives a master SI table from the SP in operation S304, a Virtual Channel Map table in operation S305, a Virtual Channel Description table in operation S306, and a Source table in operation S307.

For example, the service provider discovery operation may refer to a process that SPs providing IPTV related services search for a server that provides information on the services that the SPs provide.

A method of searching for an address list that helps receiving information on a Service Discovery (SD) server, for example, SP discovery information, may be the following three methods. First, an address preset in an image display device or an address manually set by a user may be used. Second, a DHCP based SP discovery method may be used. Third, a DNS SRV-based SP discovery method may be used.

Moreover, the image display device accesses a server having an address obtained by one of the three methods in order to receive a service provider discovery record that contains information necessary for service discovery for each SP, and performs a service search operation by using the received service provider discovery record. Moreover, the above processes may be available in a push mode or a pull mode.

Furthermore, the image display device accesses a SP attachment server designated as a SP attachment locator of a SP discovery record, and performs a registration procedure (or a service attachment procedure).

Moreover, the image display device accesses an authentication service server of the SP designated as the SP authentication locator to perform an additional authentication procedure, and then, performs a service authentication procedure.

After the service attachment procedure is successful, data transmitted from the server to the image display device may have a form of a provisioning information table.

During the service attachment operation, the image display device includes its ID and position information in data that are transmitted to the server, and a service attachment server may specify a service that the image display device subscribes on the basis of the data.

Address information used for obtaining Service Information that the image display device wants to receive may be provided in a form of the provisioning information table. In addition, the address information may correspond to access information on the master SI table. In this case, providing a customized service for each subscriber may be easy.

Moreover, the Service Information may include a master SI table record for managing access information on a virtual channel map and its version, a virtual channel map table for providing a service list in a package form, a virtual channel description table including detailed information of each channel, and a source table including access information for accessing an actual service.

Figure 4:
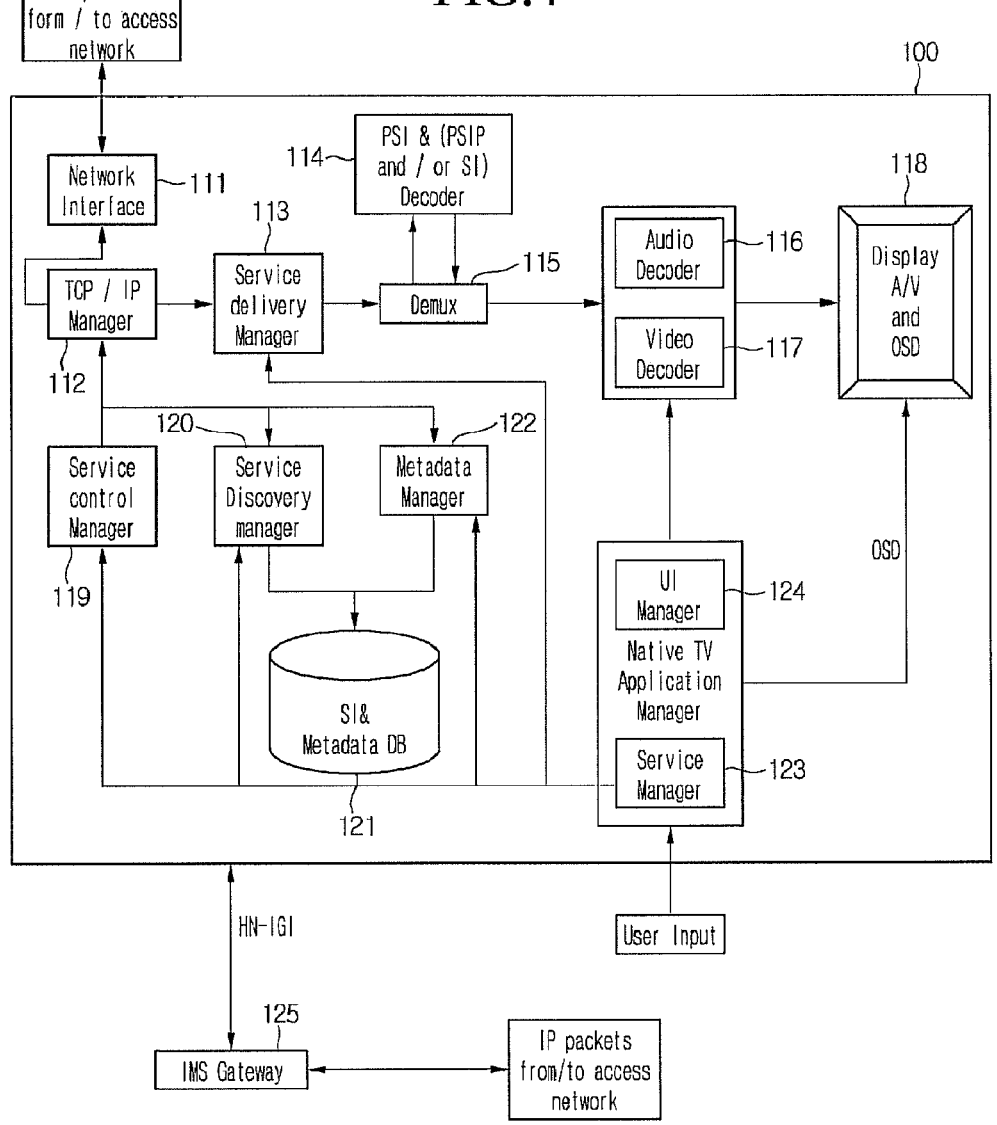
FIG. 4 is a block diagram illustrating a configuration of an image display device according to an embodiment.

FIG. 4 is a block diagram illustrating a configuration of an image display device according to an embodiment.

Referring to FIG. 4, the image display device 100 includes an Network Interface 111, a TCP/IP Manager 112, a Service Delivery Manager 113, a Demux 115, a PSI& (PSIP and/or SI) decoder 114, an Audio Decoder 116, a Video Decoder 117, a Display A/V and OSD Module 118, a Service Control Manager 119, a Service Discovery Manager 120, a Metadata Manager 122, an SI&Metadata DB 121, a UI manager 124, and a service manager 123.

The network interface 111 receives or transmits packets from or to a network. That is, the network interface unit 111 may receive services and contents from a SP via a network.

The TCP/IP manager 112 may be involved in delivering packets from a source to a destination, which are received and transmitted by the image display device 100. Moreover, the TCP/IP manager 112 classifies the received packets in order correspond to a proper protocol, and outputs the classified packets into the service delivery manager 113, the service discovery manager 120, the service control manager 119, and the metadata manager 122.

Additionally, the service delivery manager 113 is responsible for controlling the received service data. For example, when the service delivery manager 113 controls real-time streaming data, RTP/RTCP may be used.

When the real-time streaming data are transmitted using the RTP, the service delivery manager 113 parses the received data packet according to the RTP and transmits the parsed data to the Demux 115, or stores the received data packet in the SI&Metadata DB 121. Moreover, the service delivery manager 113 may feed back the network reception information to a server that provides services by using the RTCP.

The Demux 115 demultiplexes the received packet into audio, video, and Program Specific Information (PSI) data in order to transmit them into the audio/video decoders 116 and 117 and the PSI& (PSIP and/or SI) Decoder 114.

The PSI& (PSIP and/or SI) Decoder 114 may decode service information such as PSI, and for example, may receive a PSI section, a Program and Service Information Protocol (PSIP) section, or a Service Information (SI) section demultiplexed in the Demux 115 in order to decode them.

Moreover, the PSI& (PSIP and/or SI) Decoder 114 may decode the received sections to create a database for service information, and the service information may be stored in the SI&Metadata DB 121.

The audio/video decoders 116 and 117 may decode vide data and audio data received from the Demux 115, and the decoded audio and video data may be provided to a user through the Display A/V and OSD Module 118.

Moreover, the UI manager 124 and the service manager 123 may manage an overall status of the image display device 100, provide a user interface, and mange another manager.

For example, the UI manager 124 provides a Graphic User Interface (GUI) for a user through an On Screen Display (OSD), and receives a key input from a user in order to perform an operation of a receiver according to the key input. Moreover, when receiving a key input signal for a channel selection from a user, the UI manager 124 may transmit the key input signal to the service manager 123.

The service manager 123 may control a service related manager such as the service delivery manager 113, the service discovery manager 120, the service control manager 119, and the metadata manager 122.

Additionally, the service manager 123 creates a channel map, and selects a channel by using the channel map according to a key input received from the UI manager 124.

And, the service manager 123 receives service information on a channel from the PSI& (PSIP and/or SI) Decoder 114, and sets audio/video Packet Identifier (PID) of the selected channel in the Demux 115.

The service discovery manager 120 provides information necessary for selecting s SP that provides service. For example, on receiving a signal on channel selection from the service manager 123, the service discovery manager 120 may find a service by using the received signal.

Moreover, the service control manager 119 is responsible for service selection and control. For example, when a user selects a Live Broadcasting service like a typical broadcasting method, IGMP or RTSP is used. When a service such as Video On Demand (VOD) is selected, RTSP is used for service selection and control.

The RTSP protocol provides a trick mode with respect to real-time streaming. The service control manager 119 may initialize and manage a section passing through an IMC gateway by using an IP Multimedia Subsystem (IMS) and a Session Initiation Protocol (SIP).

The metadata manager 122 manages service related metadata and stores the metadata in the SI&Metadata DB 121.

And, the SI&Metadata DB 121 may store the service information decoded by the PSI& (PSIP and/or SI) Decoder 114, the metadata that the metadata manager 122 manages, and the information necessary for selecting a SP that the service discovery manager 120 provides.

Furthermore, the SI&Metadata DB 121 may store setup data on a system, and for example, may be implemented using NonVolatile RAM (NVRAM) or flash memory.

Additionally, an IG 750 may be a gateway including functions necessary for accessing an IMS based IPTV service.

Figure 5:
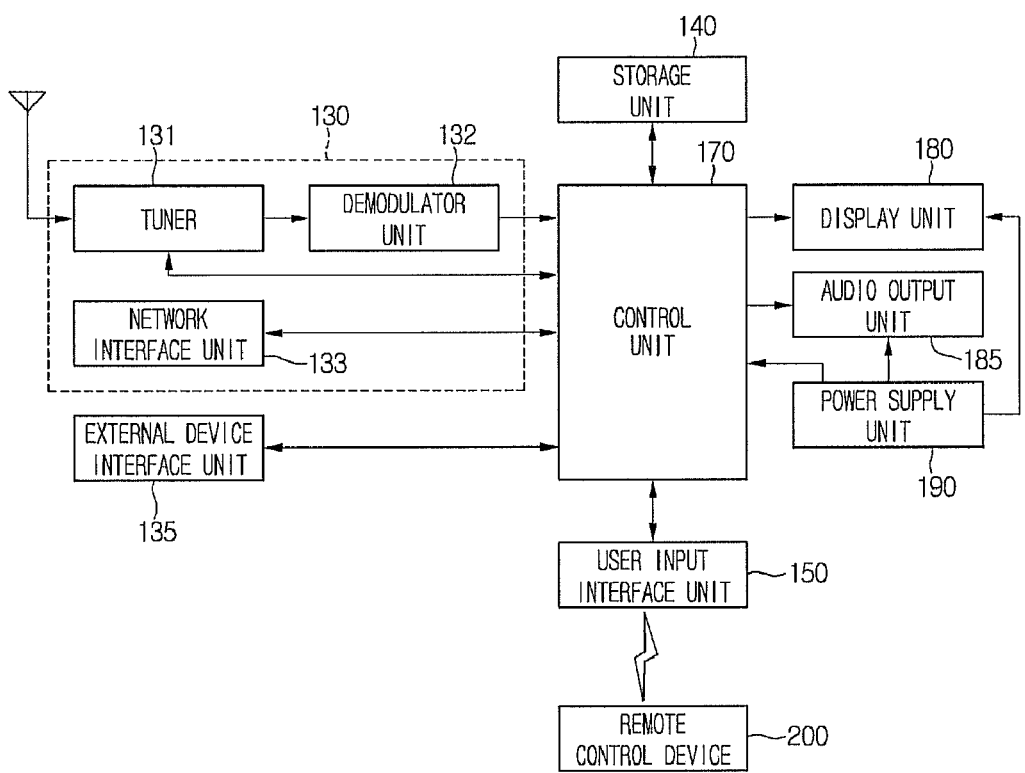
FIG. 5 is a block diagram illustrating a configuration of an image display device according to another embodiment.

FIG. 5 is a block diagram illustrating a configuration of an image display device according to another embodiment.

Referring to FIG. 5, the image display device 100 may include a broadcast receiving unit 130, an external device interface unit 135, a storage unit 140, a user input interface unit 150, a control unit 170, a display unit 180, an audio output unit 185, and a power supply unit 190. Moreover, the broadcast receiving unit 130 may include a tuner 131, a demodulation unit 132, and a network interface unit 133.

The tuner 131 may select a channel selected by a user among Radio Frequency (RF) broadcast signals received through an antenna, or an RF broadcast signal corresponding to all pre-stored channels, and may convert the selected RF broadcast signal into an intermediate frequency signal or a baseband image or sound signal.

For example, the tuner 131 converts the selected RF broadcast signal into a digital IF signal DIF if it is a digital broadcast signal, or into an analog baseband image or sound signal CVBS/SIF if it is an analog broadcast signal.

That is, the tuner 131 may process both a digital broadcast signal and an analog broadcast signal, and the analog baseband image or sound signal CVBS/SIF outputted from the tuner 131 may be directly inputted to the control unit 170.

Moreover, the tuner 131 may receive an RF broadcast signal of a single carrier according to the Advanced Television System Committee (ATSC) format or an RF broadcast signal of a plurality of carriers according to the Digital Video Broadcasting (DVB) format.

Furthermore, the tuner 131 may sequentially select RF broadcast signals of all broadcast channels stored through a channel memory function from RF broadcast signals received through an antenna, and then, may convert the selected RF broadcast signals into an intermediate frequency signal or a baseband image or sound signal.

The demodulation unit 132 may receive the digital IF signal DIF converted by the tuner 131, and then, may perform a demodulation operation thereon. For example, if the digital IF signal outputted from the tuner 131 is the ATSC format, the demodulator 132 may perform an 8-Vestigal Side Band (8-VSB) demodulation.

Additionally, the demodulation unit 132 may perform channel decoding, and for this, may include a Trellis Decoder, a De-interleaver, and a Reed Solomon Decoder to perform Trellis decoding, de-interleaving, and Reed Solomon decoding.

For example, if the digital IF signal outputted from the tuner 131 is the DVB format, the demodulation unit 132 may perform Coded Orthogonal Frequency Division Modulation (COFDMA) modulation.

Additionally, the demodulation unit 132 may perform channel decoding, and for this, may include a convolution decoder, a De-interleaver, and a Reed Solomon Decoder to perform convolutional decoding, de-interleaving, and Reed Solomon decoding.

The demodulation unit 132 may output a stream signal TS after performing demodulation and channel decoding, and the stream signal may be a signal into which an image signal, sound signal, or a data signal is multiplexed.

For example, the stream signal may be an MPEG-2 Transport Stream (TS) into which an MPEG-2 standard image signal and a Dolby AC-3 standard sound signal are multiplexed. In more detail, the MPEG-2 TS may include a 4 byte header and a 184 byte payload.

Furthermore, the demodulation unit 132 may include an ATSC demodulation unit and a DVB demodulation unit separately according to the ATSC format and the DVB format.

The stream signal outputted from the demodulation unit 132 may be inputted to the control unit 170. The control unit 180 may output an image to the display unit 180 and a sound to the audio output unit 185 after demultiplexing and processing an image/sound signal.

The external device interface unit 135 may connect an external device with the image display device 100, and for this, may include an A/V input/output unit (not shown) or a wireless communication unit (not shown).

The external device interface unit 135 may be used for wire/wireless connection of an external device such as a Digital Versatile Disk (DVD) player, a Bluray player, a game console, a camera, a camcorder, and a computer (such as a notebook computer).

Moreover, the external device interface unit 135 may deliver an image, sound, or data signal inputted from a connected external into the control unit 170 of the image display device 100, and may output the image, sound, or data signal processed in the control unit 170 into the connected external device.

The A/V input/output unit may include a USB terminal, a Composite Video Banking Sync (CVBS) terminal, a component terminal, an S-video terminal (i.e., an analog type), a Digital Visual Interface (DVI) terminal, a High Definition Multimedia Interface (HDMI) terminal, an RGB terminal, and a D-SUB terminal, in order to input an image and sound signal of an external device into the image display device 100.

Furthermore, the wireless communication unit may perform a short-range wireless communication with another electronic device. For example, the image display device 100 and another electronic device may be connected to a network through communication standards such as Bluetooth, Radio Frequency Identification (RFID), infrared Data Association (IrDA), Ultra Wideband (UWB), ZigBee, and Digital Living Network Alliance (DLNA).

Moreover, the external device interface unit 135 is connected to various set top boxes through at least one of the above various terminals in order to perform an input/output operation of a set top box.

In addition, the external device interface unit 135 may receive applications or lists of applications in an adjacent external device, and then may deliver them to the control unit 170 or the storage unit 140.

The network interface unit 133 may provide an interface for connecting the image display device 100 to a wire/wireless network including an internet network. For example, the network interface unit 133 may include an Ethernet terminal for accessing a wired network or may be connected to a wireless network through a communication standard such as Wireless LAN (WLAN) such as Wi-Fi, Wireless broadband (Wibro), World Interoperability for Microwave Access (Wimax), and High Speed Downlink Packet Access (HSDPA).

Moreover, the network interface unit 133 may transmit/receive data to/from another user or another electronic device via a connected network or another network linked to the connected network.

Additionally, the network interface unit 133 may transmit some contents data stored in the image display device 100 to a selected user or electronic device among users or other electronic devices pre-registered in the image display device 100.

The network interface unit 133 may access a predetermined web page via a connected network or another network linked to the connected network. That is, the network interface unit 133 may access a predetermined web page via a network to transmit/receive data to/from a corresponding sever.

Then, the network interface unit 133 may receive contents or data provided from a CP or a network operator. That is, the network interface unit 133 may receive contents such as movies, advertisings, games, VODs, and broadcast signals and information thereon, which are provided from a CP or an NP via a network.

Additionally, the network interface unit 133 may receive update information and update files of a firmware provided from a CP or a network operator, and may transmit data to an internet provider, a CP, or a network operator.

The network interface unit 133 may select and receive a wanted application from applications open to air via a network.

The storage unit 140 may store a program for processing and controlling each signal in the control unit 170, and may store the processed image, sound or data signals.

Moreover, the storage unit 140 may perform a function for temporarily storing image, sound or data signals inputted from the external device interface unit 135 or the network interface unit 133, and may store information on a predetermined broadcast channel through a channel memory function.

The storage unit 140 may store applications or lists of applications inputted from the external device interface unit 135 or the network interface unit 133.

The storage unit 140 may include a storage medium having at least one type of a flash memory type, a hard disk type, a multimedia card micro type, a card memory type (for example, SD or XD memory), a RAM type, and an EEPROM type.

The image display device 100 may play contents files stored in the storage unit 140 such as movie files, still image files, music files, document files, and application files and may provide them to a user.

The user input interface unit 150 may deliver a signal that a user inputs to the control unit 170 or may deliver a signal from the control unit 170 to a user. For example, the user input interface unit 150 may receive a control signal such as power on/off, channel selection, and screen setting from a remote control device 200 and may process the received control signal according to various communication methods such as an RF communication method or an IR communication method. Or, the user input interface unit 150 may transmit a control signal from the control unit 170 to the remote control device 200.

Additionally, the user input interface unit 150 may deliver to the control unit 170 a control signal inputted from a local key (not shown) such as a power key, a channel key, a volume key, and a setting key.

For example, the user input interface unit 150 may deliver to the control unit 170 a control signal inputted from a sensing unit (not shown) that senses a gesture of a user, and may transmit a signal from the control unit 170 to a sensing unit (not shown). Moreover, the sensing unit (not shown) may include a touch sensor, a sound sensor, a position sensor, and a motion sensor.

The control unit 170 may demultiplex a stream inputted from the tuner 131, the demodulation unit 132, or the external device interface unit 135, or may process demultiplexed signals in order to generate and output a signal for image or sound output.

The image signal processed in the control unit 170 is inputted to the display unit 180, and then, is displayed as an image corresponding to a corresponding image signal. Additionally, the image signal processed in the control unit 170 is inputted to an external output device through the external device interface unit 135f.

The sound signal processed in the control unit 170 may be outputted to the audio output unit 185 as audio. Moreover, the sound signal processed in the control unit 170 is inputted to an external output device through the external device interface unit 135.

Figure 6:
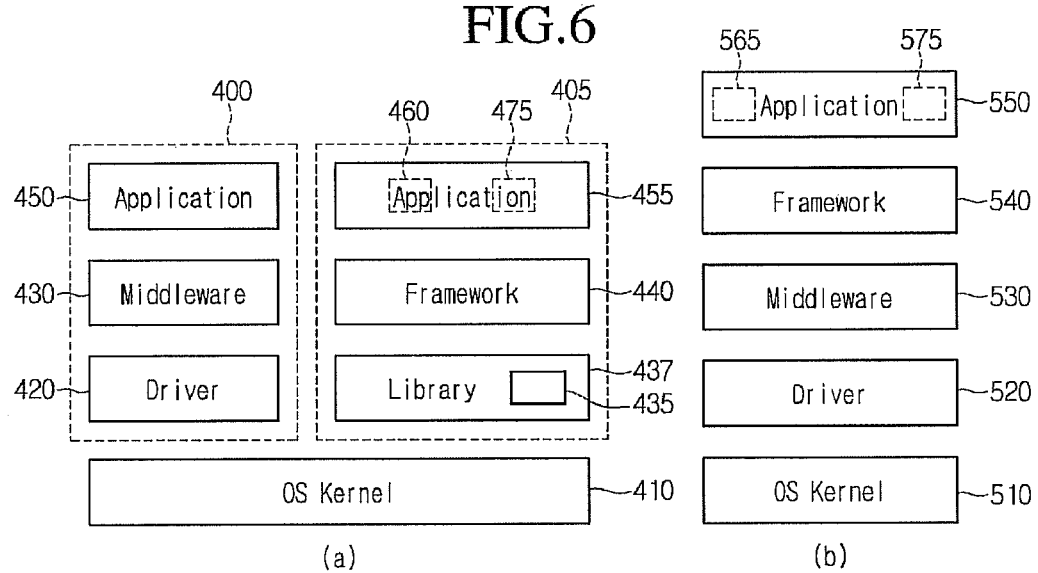
FIG. 6 is a view illustrating a platform structure of an image display device according to embodiments.

Although not shown in FIG. 6, the control unit 170 may include a demultiplexing unit and an image processing unit. This will be described below with reference to FIG. 10.

Besides that, the control unit 170 may control overall operations of the image display device 100. For example, the control unit 170 controls the turner 131 to tune an RF broadcast corresponding to a channel that a user selects or a pre-stored channel.

Additionally, the control unit 170 may control the image display device 100 through a user command inputted through the user input interface unit 150 or an internal program, and may access a network to download applications that a user wants or lists of applications into the image display device 100.

For example, the control unit 170 controls the tuner 131 to receive a signal of a selected channel according to a predetermined channel selection command received through the user input interface unit 150, and may process an image, sound, or data signal of the selected channel.

The control unit 170 may output channel information that a user selects in addition to a processed image or sound signal through the display unit 180 or the audio output unit 185.

Moreover, the control unit 170 may output an image or sound signal of an external device such as a camera or a camcorder, which is inputted through the external device interface unit 135, through the display unit 180 or the audio output unit 185 according to an external device image play command received through the user input interface unit 150.

Furthermore, the control unit 170 may control the display unit 180 to display an image, and for example, the control unit 170 may control the display unit 180 to display a broadcast image inputted through the tuner 131, an external input image inputted through the external device interface unit 135, an image inputted through a network interface unit, or an image stored in the storage unit 140. In this case, an image displayed on the display unit 180 may be a still or moving image or a 2D or 3D image.

Additionally, the control unit 170 may play contents stored in the image display device 100, received broadcast contents, or external input contents inputted from an external. The contents may have various formats such as a broadcast image, an external input image, an audio file, a sill image, an accessed web page, and a document file.

Moreover, although not shown in FIG. 5, the image display device 100 may further include a channel browsing processing unit for generating a thumbnail image corresponding to a channel signal or an external input signal.

The channel browsing processing unit receives a stream signal TS outputted from the demodulation unit 132, or a stream signal outputted from the external device interface unit 135, and extracts an image from the inputted stream signal to generate a thumbnail image.

The generated thumbnail image may be inputted to the control unit 170 as it is or after being encoded, or may be inputted to the control unit 170 after being encoded into a stream format.

The control unit 170 may display a thumbnail list including a plurality of thumbnail images on the display unit 180 by using the inputted thumbnail image. The plurality of thumbnail images in the thumbnail list may be sequentially or simultaneously updated. Accordingly, a user may simply recognize contents of a plurality of broadcast channels.

The display unit 180 converts an image signal, a data signal, and an OSD signal processed in the control unit 170, or an image signal and a data signal received in the external device interface unit 135 into R, G, and B signals in order to generate a driving signal.

For this, the display unit 180 may include a PDP, an LCD, an OLED, a flexible display, and a 3D display, or may include a touch screen used as an input device in addition to an output device.

The audio output unit 185 receives a signal sound-processed in the control unit 170, for example, a stereo signal, a 3.1 channel signal, or a 5.1 channel signal, and then, outputs the signal as sound. For this, various types of speakers may be used.

Moreover, the image display device 100 may further include a capturing unit (not shown) for capturing an image of a user, and image information obtained by the capturing unit (not shown) may be inputted to the control unit 170.

In this case, the control unit 170 may detect a user's gesture by combining an image captured through the capturing unit (not shown) and a signal detected through a sensing unit (not shown) or using it separately.

The power supply unit 190 supplies corresponding power to the image display device 100 generally. For example, the power supply unit 190 may supply power to the control unit 170, the display unit 180, and the audio output unit 185, which may be realized in a form of a System On Chip (SOC).

For this, the power supply unit 190 may include a converter (not shown) for converting AC power into DC power. If the display unit 180 is implemented using a liquid crystal panel including a plurality of backlight lamps, the power supply unit 190 may further include an inverter (not shown) for PWM operation in order to provide brightness adjustment and dimming driving.

The remote control device 200 transmits a user input to the user input interface unit 150. For this, the remote control device 200 may use Bluetooth, Radio Frequency (RF) communication, IR communication, Ultra Wideband (UWB), or ZigBee.

Additionally, the remote control device 200 receives an image, sound, or data signal outputted from the user input interface unit 150, and then, displays the received signal or outputs sound or vibration.

The image display device 100 may be a fixed digital broadcast receiver that receives at least one of an ATSC type (8-VSB type) digital broadcast, a DVB-T type (COFDM type) digital broadcast, and an ISDB-T type (BST-OFDM type) digital broadcast.

Moreover, since the image display device 100 of FIG. 5 is just one embodiment of the present invention, some components shown herein may be integrated, added, or omitted according to the specification of the actually-realized image display device 100.

That is, more than two components may be integrated into one component, or one component may be divided into more than two components, if necessary. Furthermore, a function in each block is used for describing an embodiment of the present invention, and its specific operation or device does not limit the scope of the present invention.

According to another embodiment of the present invention, unlike FIG. 5, the image display device 100 may receive an image through the network interface unit 133 or the external device interface unit 135 and may play the received image without the tuner 131 and the demodulation unit 132

For example, the image display device 100 may include an image processing device such as a set top box for receiving broadcast signals or contents according to various network services and a contents playing device for playing contents inputted from the image processing device.

In this case, a method of providing an external device list according to an embodiment may be performed by the above separated image processing device such as a set top box or the above separate contents playing device including the display unit 180 and the audio output unit 185 in addition to the image display device 100 described with reference to FIG. 5.

FIG. 6 is a view illustrating a platform structure of an image display device. The platform of the image display device 100 may include OS-based software for performing the above various operations.

Referring to FIG. 6A, the platform of the image display device 100 as a separate platform includes a Legacy System platform 400 and a smart system platform 405, which are separately designed.

An OS kernel 410 may be commonly used in the Legacy System platform 400 and the smart system platform 405. The Legacy System platform 400 may include a driver 420, a Middleware 430, and an Application 450 on the OS kernel 410.

Moreover, the smart system platform 405 may include a Library 435, a Framework 440, and an application 455 on the OS kernel 410.

The OS kernel 410 as a core of an operating system may provide hardware driver driving when the image display device 100 is driven, the security of hardware and a processor in the image display device 100, efficient management of a system resource, memory management, an interface for hardware by hardware abstraction, a multi processor, schedule management according to a multi processor, and power management.

For example, a hardware driver in the OS kernel 410 may include at least one of a display driver, a Wi-Fi driver, a Bluetooth driver, a USB driver, an audio driver, a power management driver, a binder driver, and a memory driver.

Moreover, the hardware driver in the OS kernel 410 as a driver for a hardware device in the OS kernel 410 may include a character device driver, a block device driver, and a network device driver.

Furthermore, the block device driver may include a buffer for storing a unit size as data are transmitted by a specific block unit, and the character device driver may not include the buffer as data are transmitted by a basic data unit, i.e., a character unit.

The OS kernel 410 may be implemented with various OS based kernels such as Unix base (Linux) kernel and Window base kernel, and may be available for other electronic devices as an open OS.

The driver 420 is disposed between the OS kernel 410 and the middleware 430, and drives a device in order for operations of the middleware 430 and the application 450.

For example, the driver 420 may include drivers for a micom, a display module, a Graphic Processing Unit (GPU), a Frame Rate Converter (FRC), a General Purpose Input/Output Pin (GPIO), an HDMI, a System Decoder or demultiplexer (SDEC), a Video Decoder (VDEC), an Audio Decoder (ADEC), a Personal Video Recorder (PVR), an Inter-Integrated Circuit (I2C) in the image display device 100. The above drivers may operate in linkage with a hardware driver in the OS kernel 410.

Additionally, the driver 420 may further include a driver for a remote control device 200, for example, a space remote controller. The driver for a space remote controller may be included in the OS kernel 410 or the middleware 430 in addition to the driver 420.

The middleware 430 is disposed between the OS kernel 410 and the application 450, and serves as a medium to exchange data between other hardware or software. Accordingly, the standardized interface may be available, and various environmental supports and interworking with other tasks having different systems may also be available.

For example, the middleware 430 in the legacy system platform 400 may include a Multimedia and Hypermedia information coding Experts Group (MHEG) middleware and an Advanced Common Application Platform (ACAP) middleware, and may further include a PSIP or SI middleware (i.e., a broadcast information related middleware), and a DLNA middleware (i.e., a peripheral communication related middleware).

Additionally, the application 450 on the middleware 430, i.e., the application 450 in the legacy system platform 400, may include a User Interface Application for various menus in the image display device 100.

The application 450 on the middleware 430 may be edited by a user's choice and may be updated via a network. Through the application 450, it is possible to enter a wanted menu in various user interfaces according to an input of a remote control device while watching a broadcast image.

Moreover, the application 450 in the legacy system platform 400 may further include at least one of a TV guide application, a Bluetooth application, a reservation application, a Digital Video Recorder (DVR) application, and a hotkey application.

Moreover, the library 435 in the smart system platform 405 is disposed between the OS kernel 410 and the framework 440, and forms a base of the Framework 440. For example, the library 435 may include a Secure Socket Layer (SSL) (i.e., a security related library), a WebKit (i.e., a web engine related library), a libc (i.e., a c library), and a Media Framework (i.e., a media related library such as video formats and audio formats. The library 435 may be programmed with C or C++, so that it may be exposed to developer through the framework 440.

The library 435 may include the runtime 437 having a core java library and a Virtual Machine (VM). The runtime 437 may form a basic of the framework 440 in addition to the library 435.

The VM may perform a plurality of instances, i.e., multitasking. Furthermore, according to each application in the application 455, each VM may be allocated and executed. In this case, a Binder driver (not shown) in the OS kernel 410 may operate for schedule adjustment or interconnect between plurality of instances.

In addition, the binder driver and the runtime 437 may connect a java-based application with a C-based library. The library 436 and the runtime 437 may correspond to the middleware of the legacy system.

Moreover, the framework 440 in the smart system platform 405 includes a program, which is a base of an application in the application 455. The framework 440 is compatible with any application. Its component may be reused, moved, or replaced.

The framework 440 may include a support program, i.e., a program for binding components of other software. For example, the framework 440 may include a resource manager, an activity manager related to the activity of application, a notification manager, and a content provider for summarizing sharing information between applications.

The application 455 on the framework 440 includes various programs that are driven in the image display device 100 to be displayed. For example, the application 455 may include a Core Application that has at least one of email, short message service (SMS), calendar, map, and browser.

Furthermore, the above framework 440 or application 450 may be programmed with JAVA.

In addition, the application 455 may be divided into an application 460 stored in the image display device 100 and cannot be deleted by a user and an application 475 downloaded via a network and stored and freely installed or deleted by a user.

Through applications in the application 455, internet phone service, Video On Demand (VOD) service, web album service, Social Networking Service (SNS), Location Based Service (LBS), map service, web search service, and application search service may be provided. Additionally, various functions such as games and scheduling may be performed.

Moreover, as shown in FIG. 6B, the platform of the image display device 100 as an integrated platform may include an OS kernel 510, a driver 520, a Middleware 530, a Framework 540, and an Application 550.

When compared to FIG. 6A, there are differences that the library 435 is omitted and the application 550 is an integrated layer in the platform shown in FIG. 6B. Besides that, the driver 520 and the framework 540 are the same as those in FIG. 6A.

The platforms shown in FIGS. 6A and 6B may be generally available for various electronic devices in addition to the image display device 100, and may be stored in or loaded into the storage unit 140 or control unit of FIG. 5, or an additional processor (not shown).

Moreover, the platform may be stored in or installed into the SI&metadata DB 711, UI manager 714, and service manager 713 of FIG. 4, and may further include an additional application processor (not shown) to execute the application.

Furthermore, a method of providing an external device list according to an embodiment, which will be described in detail below, may be implemented with a computer executable program.

Figure 7:
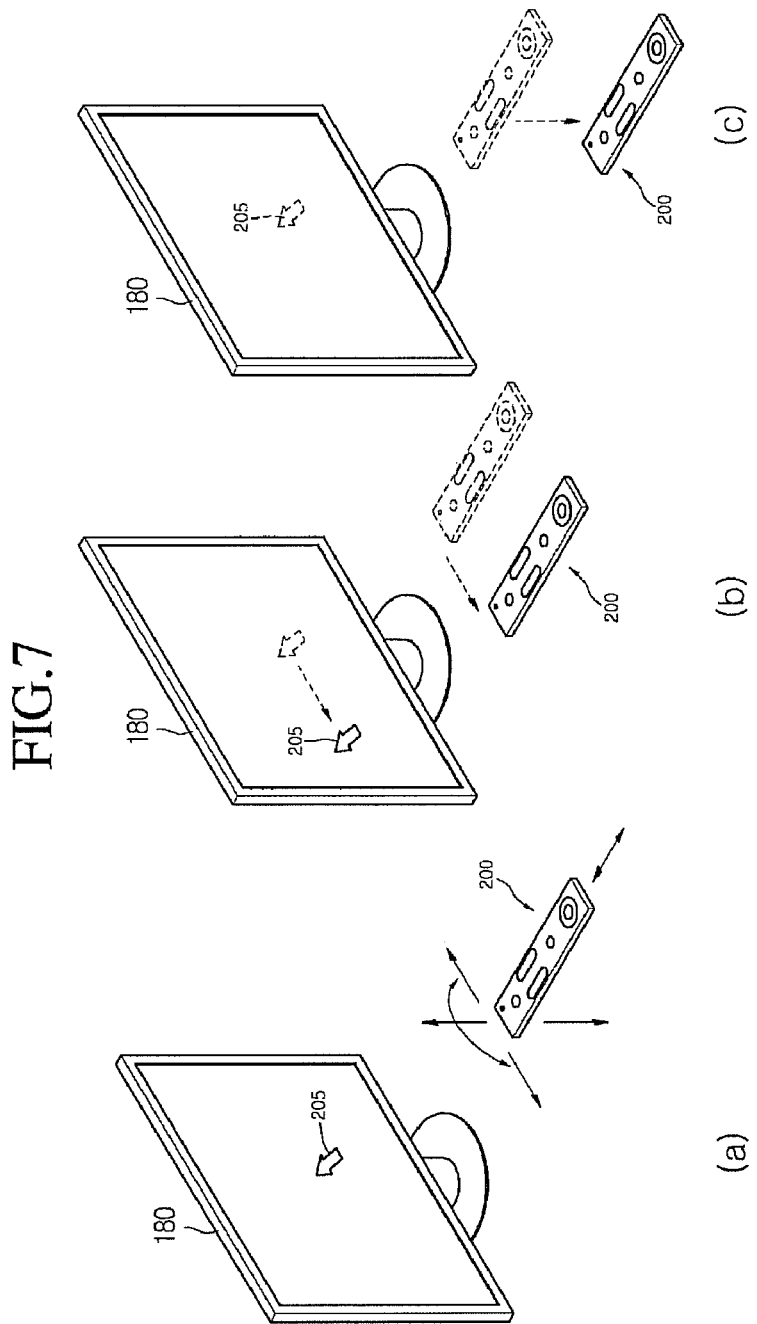
FIG. 7 is a view illustrating a method of controlling an operation of an image display device by using a remote control device according to an embodiment.

FIG. 7 is a view illustrating a method of providing an external device list through a remote control device according to an embodiment.

As shown in FIG. 7A, a pointer 205 corresponding to the remote control device 200 is displayed on a display unit 180.

A user may move the remote control device 200 up and down and left and right, or may rotate it. The pointer 205 displayed on the display unit 180 of the image display device corresponds to the movement of the remote control device 200. Since the corresponding pointer 205 moves and is displayed corresponding to the movement on 3D space as shown in the drawing, the remote control device 200 may be called a space remote controller.

As shown in FIG. 7B, when a user moves the remote control device 200 to the left, the pointer 205 displayed on the display unit 180 of the image display device moves to the left in correspondence to the movement of the remote control device 200.

Information on the movement of the remote control device 200, which is sensed by a sensor of the remote control device 200, is transmitted to the image display device. The image display device may calculate the coordinates of the pointer 205 from the information on the movement of the remote control device 200. The image display device may display the pointer 205 in correspondence to the calculated coordinates.

FIG. 7C illustrates the case that a user moves the remote control device 200 away from the display unit 180 while a specific button in the remote control device 200 is pressed. By doing so, a selected area in the display unit 180 corresponding to the pointer 205 may be zoomed in and enlarged.

On the contrary, when a user moves the remote control device 200 closer to the display unit 180, a selected area on the display unit 180 corresponding to the pointer 205 may be zoomed out and reduced.

On the other hand, when the remote control device 200 becomes far from the display unit 180, a selected area may be zoomed out, and when the remote control device 200 becomes closer to the display unit 180, a selected area may be zoomed in.

Moreover, while a specific button in the remote control device 200 is pressed, up/down and left/right movements may be disregarded. That is, when the remote control device 200 becomes closer to or away from the display unit 180, up/down and left/right movements may be disregarded but only the back and forth movements may be recognized. While a specific button in the remote control device 200 is not pressed, the pointer 205 moves in correspondence to the up/down and left/right movements of the remote control device 200.

Moreover, the moving speed or moving direction of the pointer 205 may correspond to that of the remote control device 200.

Furthermore, the pointer of this specification means an object displayed on the display unit 180 in correspondence to an operation of the remote control device 200. Accordingly, besides an arrow shape displayed as the pointer 205 in the drawing, the pointer 205 may have various shapes of objects. For example, the pointer 205 conceptually may include a dot, a cursor, and a thick outline. Moreover, the pointer 205 may be displayed on the display unit 180, corresponding to a point on the x-axis and the y-axis, and also a plurality of points such as a line and a surface.

Figure 8:
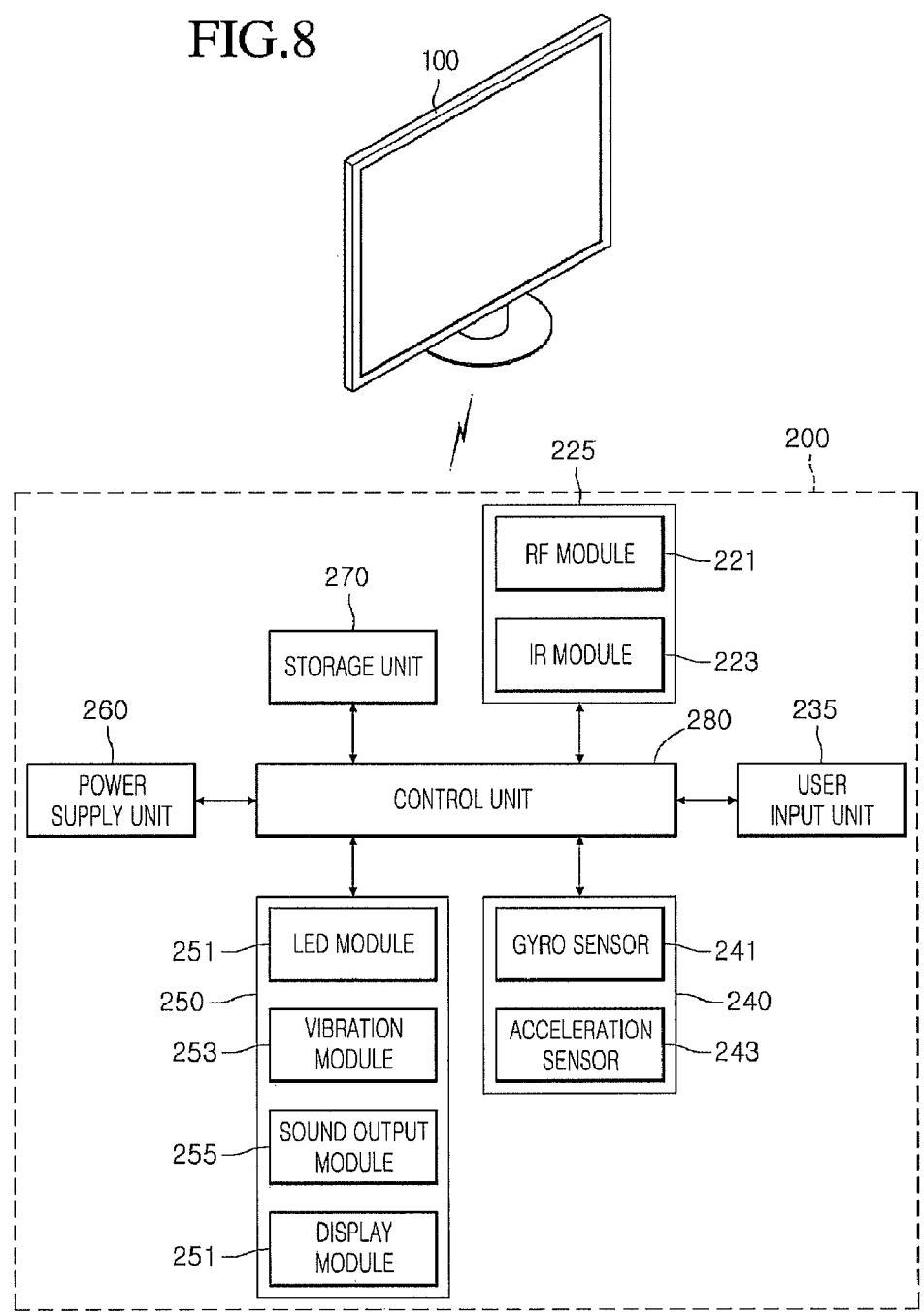
FIG. 8 is a block diagram illustrating a configuration of a remote control device according to an embodiment.

FIG. 8 is a block diagram illustrating a configuration of a remote control device according to an embodiment. The remote control device 200 may include a wireless communication unit 225, a user input unit 235, a sensor unit 240, an output unit 250, a power supply unit 260, a storage unit 270, and a control unit 280.

Referring to FIG. 8, the wireless communication unit 225 transmits/receives a signal to/from an arbitrary one of the image display devices according to the above-mentioned embodiments.

The remote control device 200 includes an RF module 221 for transmitting/receiving a signal to/from the image display device 100 according to RF communication standards, and an IR module 223 for transmitting/receiving a signal to/from the image display device 100 according to IR communication standards.

Moreover, the remote control device 200 transmits a signal containing information on the movement thereof to the image display device 100 through the RF module 221.

Moreover, the remote control device 200 may receive a signal that the image display device 100 transmits through the RF module 221, and may transmit commands on power on/off, channel change, and volume change to the image display device 100 through the IR module 223, if necessary.

The user input unit 235 may be configured with a keypad, a button, a touch pad, or a touch screen. A user may input commands related to the image display device 100 to the remote control device 200 by manipulating the user input unit 235. If the user input unit 235 has a hard key button, a user may input commands related to the image display device 100 to the remote control device 200 through a push operation of the hard key button.

If the user input unit 235 has a touch screen, a user may input commands related to the image display device 100 to the remote control device 200 by touching a soft key of the touch screen. Moreover, the user input unit 235 may include various kinds of input means that a user manipulates such as a scroll key and a jog key, and this embodiment does not limit the scope of the present invention.

The sensor unit 240 may include a gyro sensor 241 or an acceleration sensor 243. The gyro sensor 241 may sense information on the movement of the remote control device 200.

For example, the gyro sensor 241 may sense information on the operation of the remote control device 200 on the bases of x, y, and z axes and the acceleration sensor 243 may sense information on the moving speed of the remote control device 200. Furthermore, the remote control device 200 may further include a distance measurement sensor that senses the distance between the remote control device 200 and the display unit 180 of the image display device 100.

The output unit 250 may output an image or sound signal corresponding to the manipulation of the user input unit 235 or a signal transmitted from the image display device 100. A user may recognize the manipulation of the user input unit 235 or the control of the image display device 100 through the output unit 250.

For example, the output unit 250 may include an LED module that is turned on/off, a vibration module 253 that vibrates, a sound outputting module 255 that outputs sound, or a display module 257 that outputs an image, when the user input unit 235 is manipulated or a signal is transmitted to or received from the image display device 100 through the wireless communication unit 225.

Moreover, the power supply unit 260 supplies power to the remote control device 200, and stops supplying power to the remote control device 200 when the remote control device 200 does not move for a predetermined time, so that power waste may be reduced. The power supply unit 260 may restart to supply power after a predetermined key in the remote control device 200 is manipulated.

The storage unit 270 may store various kinds of programs and application data necessary for controls or operations of the remote control device 200. If the remote control device 200 wirelessly transmits and receives a signal through the image display device 100 and the RF module 221, the remote control device 200 and the image display device 100 may transmit/receive a signal in a predetermined frequency band.

The control unit 280 of the remote control device 200 may store in the storage unit 270 information on a frequency band for wirelessly transmitting/receiving a signal to/from the image display device 100 paired with the remote control device 200, and may refer to the stored information.

The control unit 280 controls general matters related to a control of the remote control device 200. The control unit 280 may transmit to the image display device 100 a signal corresponding to a predetermined key manipulation of the user input unit 235 or a signal corresponding to the movement of the remote control device 200 sensed by the sensing unit 240 through the wireless communication unit 225.

Figure 9:
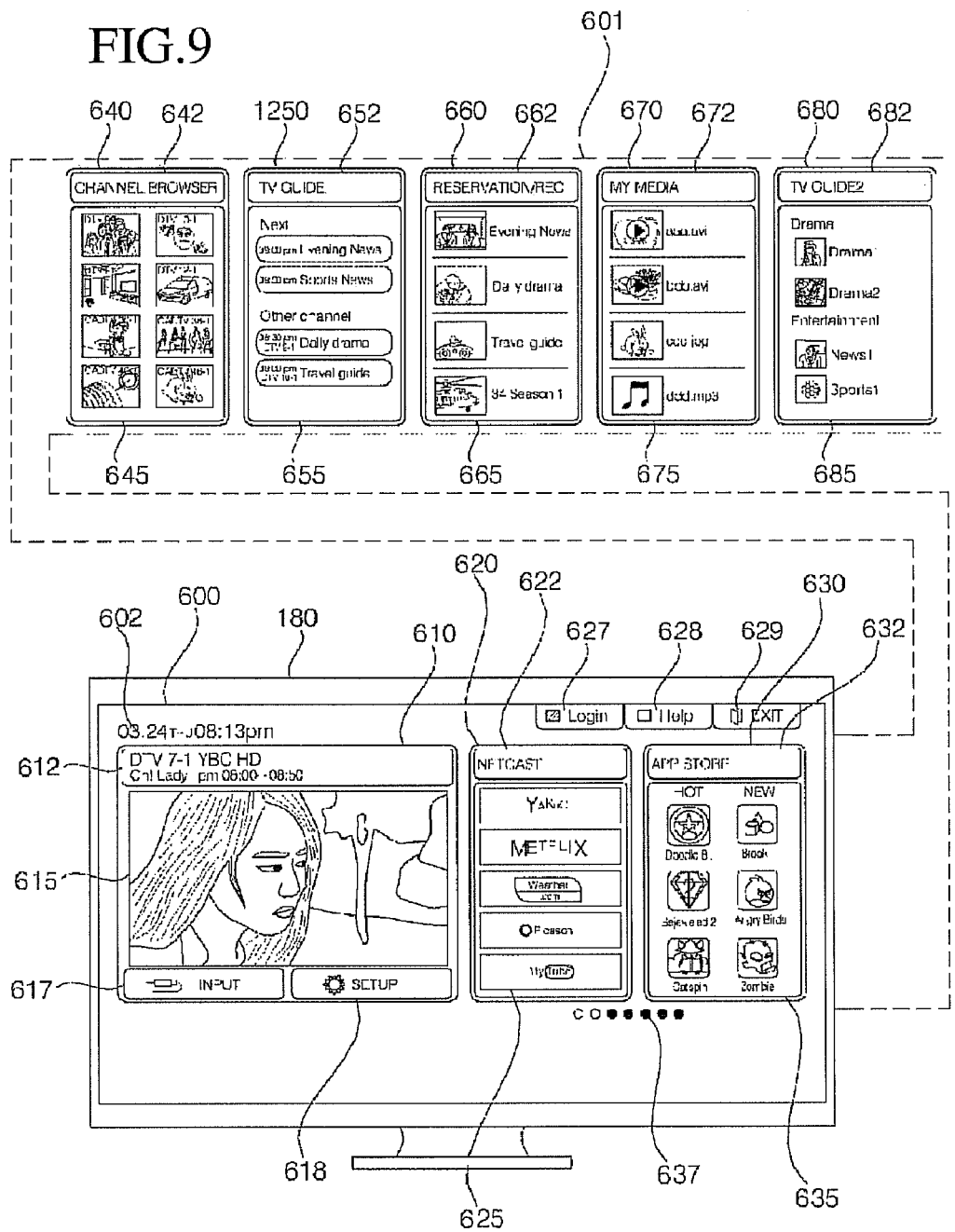
FIG. 9 is a view illustrating a configuration of a home screen displayed on an image display device according to an embodiment.

FIG. 9 is a view illustrating a configuration of a home screen displayed on an image display device according to an embodiment.

The configuration of the home screen shown in FIG. 9 may be an example of a basic screen of the image display device 100. Such a screen may be set with an initial screen when power is on or starting from a standby mode, or a basic screen by an operation of a home key equipped in the remote control device 200.

Referring to FIG. 9, the home screen 600 may include a card object region. The card object region may include a plurality of card objects 610, 620, and 630, which are classified by the sources of contents.

A card object BROADCAST 610 for displaying a broadcast image, a card object NETCAST 620 for displaying a CP list, and a card object APP STORE for displaying a list of applications provided are shown in the drawing.

Moreover, as a card object that is not displayed on the display unit 180 and is disposed on a hidden area 601 but is replaced and displayed when a card object is moved, a card object CHANNEL BROWSER 640 for displaying a thumbnail list of broadcast channels, a card object TV GUIDE 650 for displaying a broadcast guide list, a card object RESERVATION/REC 660 for displaying a reservation list, a card object MY MEDIA 670 for displaying a media list of a device disposed in or connected to the image display device, and a card object TV GUIDE2 680 for displaying a broadcast guide list may be shown in the drawing.

The card object BROADCAST 610 for displaying a broadcast image may include a broadcast image 615 received through the tuner 110 or the network interface unit 130, an object 612 for displaying corresponding broadcast image related information, an object 617 for displaying an external device, and a setup object 618.

Since the broadcast image 615 is displayed as a card object and its size is fixed by a locking function, a user may continuously watch a broadcast image.

The broadcast image 615 may have a size that is changed by the manipulation of a user. For example, the size of the corresponding broadcast image 615 may be enlarged or reduced by drag using the pointer 205 of the remote control device 200. By such an enlargement or reduction, the number of card objects displayed on the display unit 180 may be two or four instead of three in the drawing.

Moreover, when the broadcast image 615 in the card object is selected, it may be displayed on the display unit 180 in a full screen.

The object 612 for displaying corresponding broadcast image related information may include a channel number DTV7-1, a channel name YBC HD, a broadcast program title Oh! Lady, and a broadcast time pm 08:0008:50. By doing so, a user may intuitively recognize information on the broadcast image 615.

When the object 612 for displaying corresponding broadcast image related information is selected, related EPG information may be displayed on the display unit 180.

Moreover, an object 602 for displaying a date 03.24, a day of the week THU, and a current time pm 08:13 may be displayed on the card object 610 for displaying a broadcast image. By doing so, a user may intuitively recognize time information.

An object 617 for displaying an external device may display an external device connected to the image display device 100. For example, when the object 617 for displaying an external device is selected, a list of external devices connected to the image display device 100 may be displayed.

The setup object 618 may be used for inputting various settings of the image display device 100. For example, various settings such as image setting, audio setting, screen setting, reservation setting, pointing setting of the remote control device 200, and network setting may be made.

Moreover, the card object 620 for displaying a CP list may include a card object title NETCAST 622 and a CP list 625. In the drawing, Yakoo, Metflix, weather.com, Picason, and My tube are shown as CPs in the CP list 625, but various settings are possible.

When the card object title 622 is selected, the corresponding card object 620 may be displayed on the display unit 180 in a full screen.

Moreover, when a predetermined CP in the CP list 625 is selected, a screen including a contents list that a corresponding CP provides may be displayed on the display unit 180.

The card object 630 for displaying a list of applications provided may include the card object title APP STORE 632 and the application list 635. The application list 635 may be a list, which is aligned being classified by each item in an application store. In the drawing, the list may be displayed being aligned in a popular order HOT and the latest order NEW, but the present invention is not limited thereto. That is, various examples are available.

When the card object title 632 is selected, the corresponding card object 630 may be displayed on the display unit 180 in a full screen.

Moreover, when a predetermined application item in the application list 635 is selected, a screen for providing information on a corresponding application may be displayed on the display unit 180.

A login item 627, a help item 628, and an exit item 629 may be displayed on the card objects 620 and 630.

The login item 627 may be used for accessing an application store or logging in a network connected to an image display device. The help item 628 may be used for the help during an operation of the image display device 100. The exit item 629 may be used for exiting from a corresponding home screen. At this point, a broadcast image being received may be displayed in a full screen.

An object for displaying the number of entire card objects may be displayed below the card objects 620 and 630. The object may display the number of entire card objects, of course, the number of card objects among the entire card objects displayed on the display unit 180.

Moreover, the card object 640 for displaying a thumbnail list of a broadcast channel may include a card object title CHANNEL BROWSER 642 and a thumbnail list 645 of a broadcast channel. Broadcast channels received sequentially are displayed as thumbnail images in the drawing, but the present invention is not limited thereto. That is, a video is possible. The thumbnail list may include a thumbnail image and channel information on a corresponding channel. By doing so, a user may intuitively recognize content of a corresponding channel.

Such a thumbnail image may be a thumbnail image on a preference channel that a user registers in advance or a thumbnail image on a channel after or before the broadcast image 615 in the card object 610. Moreover, eight thumbnail images are shown in the drawing, but various settings are possible. Additionally, a thumbnail image in a thumbnail list may be updated.

When the card object title 642 is selected, the corresponding card object 640 may be displayed on the display unit 180 in a full screen. That is, content on a thumbnail list may be displayed on the display unit 180.

Moreover, when a predetermined thumbnail image in the thumbnail list 645 of a broadcast channel is selected, a broadcast image corresponding to a corresponding thumbnail image may be displayed on the display unit 180.

The card object 650 for displaying a broadcast guide list may include a card object title TV GUIDE 652 and a broadcast guide list 655. The broadcast guide list 655 may be a list for broadcast programs or broadcast images of other channels after the broadcast image 615 in the card object 610, but the present invention is not limited thereto. That is, various examples are available.

Additionally, when the card object title 652 is selected, the corresponding card object 650 may be displayed on the display unit 180 in a full screen.

Moreover, when a predetermined broadcast item in the broadcast guide list 655 is selected, a broadcast image corresponding to a corresponding broadcast item may be displayed on the display unit 180, or broadcast information corresponding to a corresponding broadcast item may be displayed on the display unit 180.

The card object 660 for displaying a broadcast reservation list or a recording list may include a card object title RESERVATION/REC 662 and a broadcast reservation list or recording list 665. The broadcast reservation list or recording list 665 may be a list including broadcast items that a user reserves in advance or broadcast items recorded according thereto. In the drawing, a thumbnail image is displayed by each corresponding item, but various examples are available.

Additionally, when the card object title 662 is selected, the corresponding card object 660 may be displayed on the display unit 180 in a full screen.

Furthermore, a broadcast item set in advance for reservation or a broadcast item recorded in the broadcast reservation list or recording list 665 is selected, broadcast information on a corresponding broadcast or a recorded broadcast image may be displayed on the display unit 180.

The card object 670 for displaying a media list may include a card object title MY MEDIA 672 and a media list 675. The media list 675 may be a list of media stored in the image display device 100 or stored in a device connected to thereto. Video, still images, and audio are shown as an example in the drawing, but besides that, various examples such as text documents and e-book documents are available.

Additionally, when the card object title 672 is selected, the corresponding card object 670 may be displayed on the display unit 180 in a full screen.

Moreover, when a predetermined media item in the media list 675 is selected, a screen corresponding to a corresponding media may be displayed on the display unit 180.

The card object TV GUIDE 680 for displaying a broadcast guide list may include a card object title TV GUIDE 682 and a broadcast guide list 685. The broadcast guide list 685 may be a guide list for each broadcast type. A list for each broadcast type is shown in the drawing by classifying broadcasts into entertainments such as drama, news, or sports, but various settings are available. That is, the broadcast guide list may be a list for each type such as drama, movie, news, sports, and animation. By doing so, a user may confirm a guide list that classifies broadcasts into each genre When the card object title 682 is selected, the corresponding card object 680 may be displayed on the display unit 180 in a full screen.

Moreover, when a predetermined broadcast item in the broadcast guide list 685 is selected, a screen corresponding to a corresponding broadcast image may be displayed on the display unit 180.

The card objects 620 and 630 displayed on the display unit 180 and the card objects 640, 650, 660, 670, and 680 disposed on the hidden area 601 and not displayed on the display unit 180 may be interchangeable by an input for moving a card object.

That is, at least one of the card objects 620 and 630 displayed on the display unit 180 may be moved on the hidden area 601, and at least one of the card objects 640, 650, 660, 670, and 680 disposed on the hidden area 601 may be displayed on the display unit 180.

Furthermore, the home screen 600 of the image display device 100 may further include a card object for displaying information on software upgrade.

Figure 10:
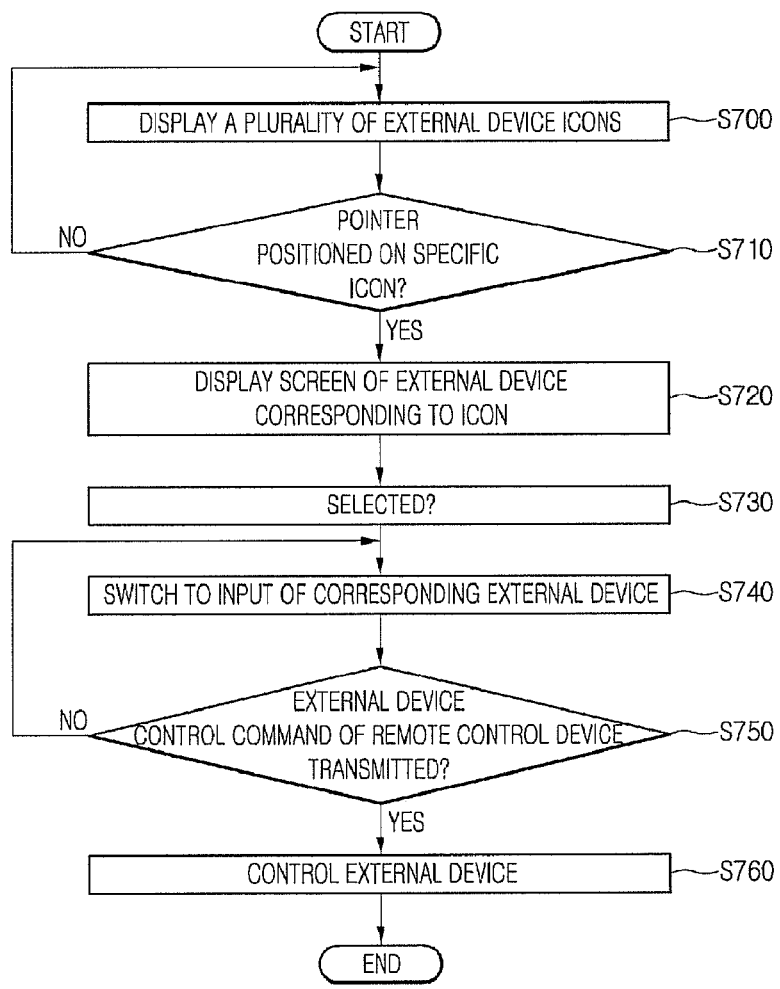
FIG. 10 is a flowchart illustrating a method of providing an external device list according to a first embodiment.

Hereinafter, referring to FIGS. 10 to 16, a method of providing an external device list according to a first embodiment will be described. FIG. 10 is a flowchart illustrating the method of providing an external device list according to the first embodiment. FIGS. 11 to 16 are views illustrating a screen that provides an external device list of an image display device according to the first embodiment.

Referring to FIGS. 10 to 16, first, the control unit 170 displays a plurality of external device icons, which allows external devices to be connected to the image display device 100, on the display unit 180 of the image display device 100 in operation S700. Here, a plurality of external devices as external devices connected to the image display device 100 via a wired/wireless network may include a Digital Versatile Disc (DVD) player, a DVD recorder, a Blu-ray Disc (BD) player, a set top box, a digital TV, a personal computer (PC), a camera, a camcorder, an HDD player, and a memory card. However, they are just examples of external devices. Thus, a device having a built-in recording medium for recording a file may serve as an external device.

Figure 11:
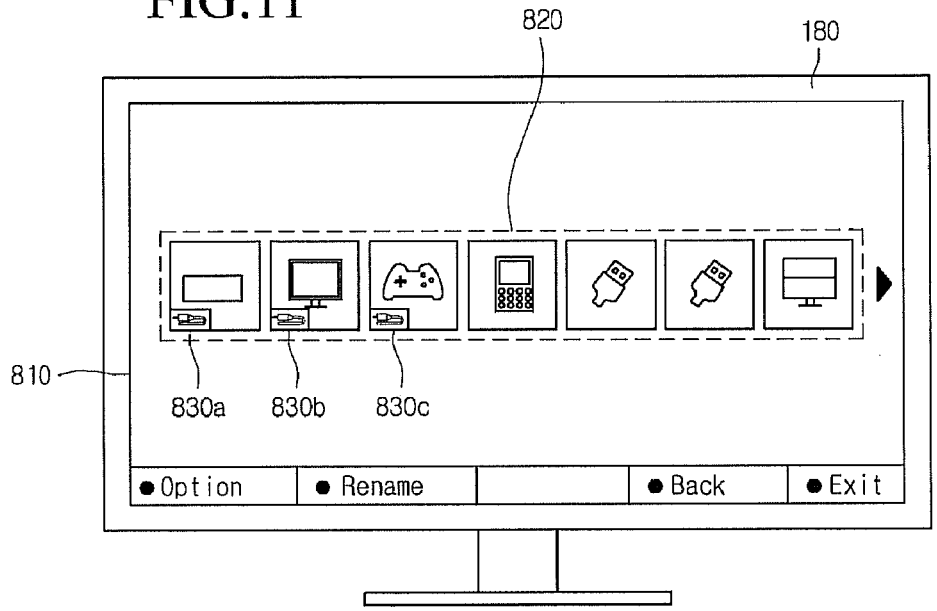
FIGS. 11 to 17 are views illustrating a screen that provides an external device list of an image display device according to the first embodiment.

As shown in FIG. 11, a plurality of external device icons 820 representing a plurality of external devices are displayed on the full screen 810 of the display unit 180. Moreover, the control unit 170 determines which external device icons 820 are connected to the image display device 100 in order to display specific symbols 830*a*, 830*b*, and 830*c* on the external device icons that are being connected to the image display device 100. Therefore, external device icons that are not being connected to the image display device 100 are distinguished. Here, displaying a specific symbol on an external device icon is used as one example of a method of distinguishing icons from each other, but the present invention is not limited thereto. That is, any one of letters, symbols, colors, and flashing lights may be used for distinction.

The control unit 170 determines which one of the plurality of external device icons displayed on the display unit 180 has a pointer thereon in operation S710.

Figure 12:
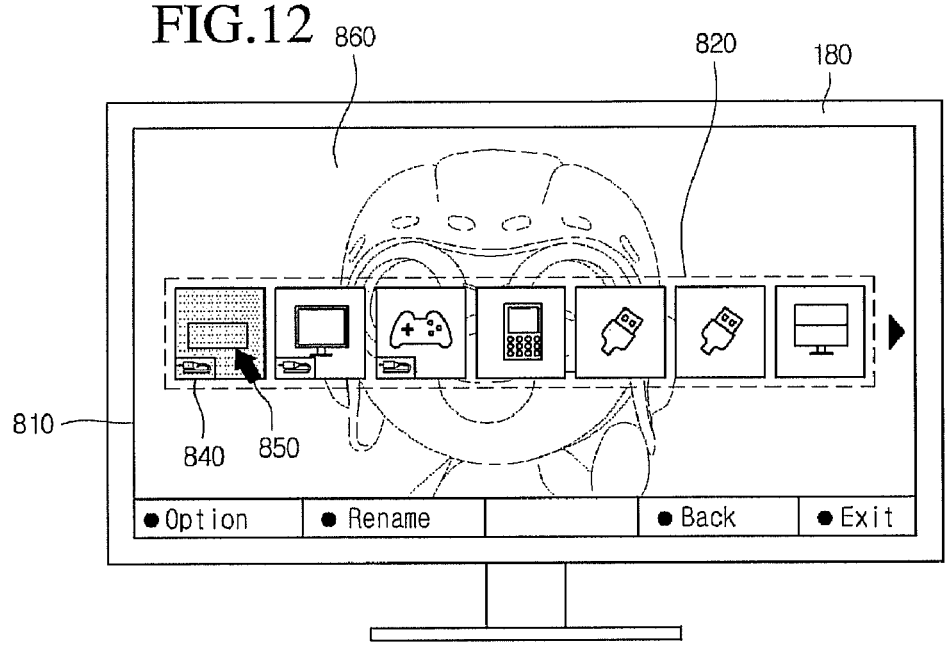

As shown in FIG. 12, when the pointer 850 is positioned on the first external device icon 840 among the plurality of external device icons 820, the control unit 170 may display an image signal 860, which is inputted from an external device related the first external device icon 840 (for example, a BD player), on the full screen 810 of the image display device 100 in operation S720. Through this, a user could confirm an image signal in advance, which is inputted from an external device before switching the input of the external device, so that the user's convenience may be improved.

Moreover, when the pointer 850 is positioned on the first external device icon 840 among the plurality of external device icons 820, the first external device icon 840 having the pointer 850 thereon may be highlighted.

Figure 13:
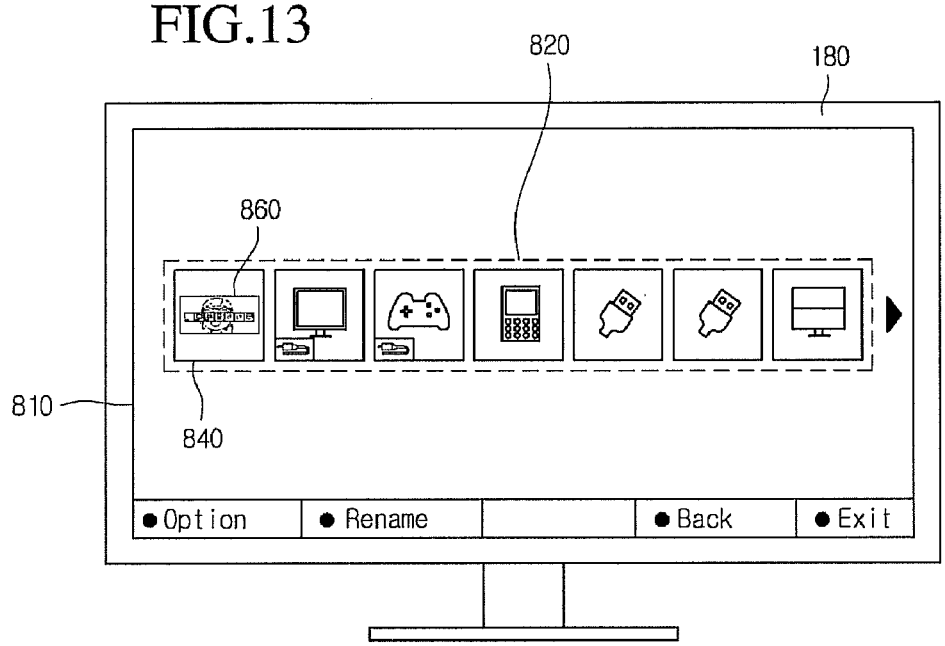

Moreover, as shown in FIG. 13, an image signal 860 of an external device related to the first external device icon 840 having the pointer 850 thereon may be displayed on the area where the first external device icon 840 is displayed.

Figure 14:
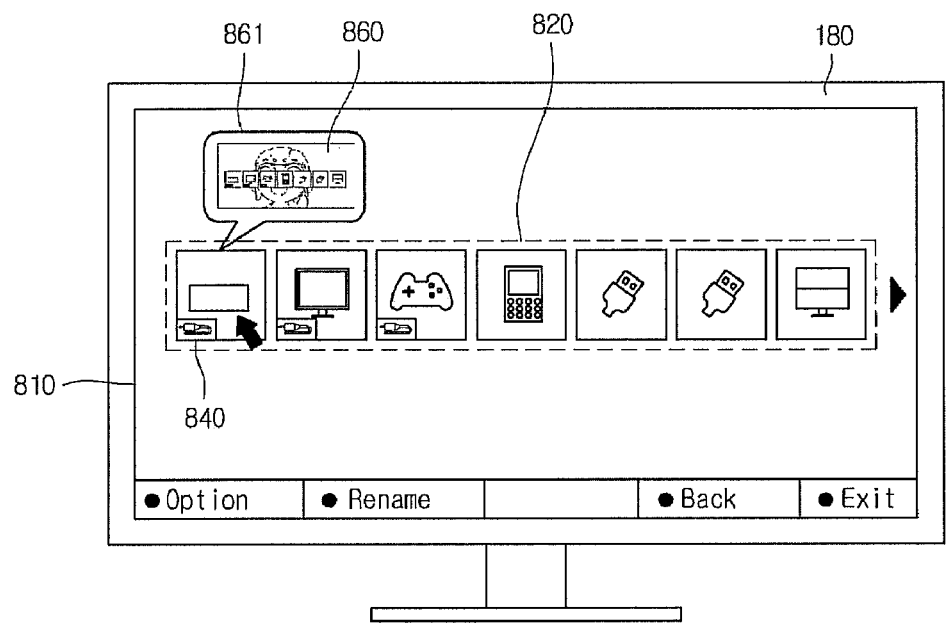

Moreover, as shown in FIG. 14, when the pointer 850 is positioned on the first external device icon 840, a predetermined popup window 861 is displayed on an area adjacent to the first external device icon 840, and an image signal 860 of an external device related to the first external device icon 840 may be displayed on the popup window 861.

Figure 15:
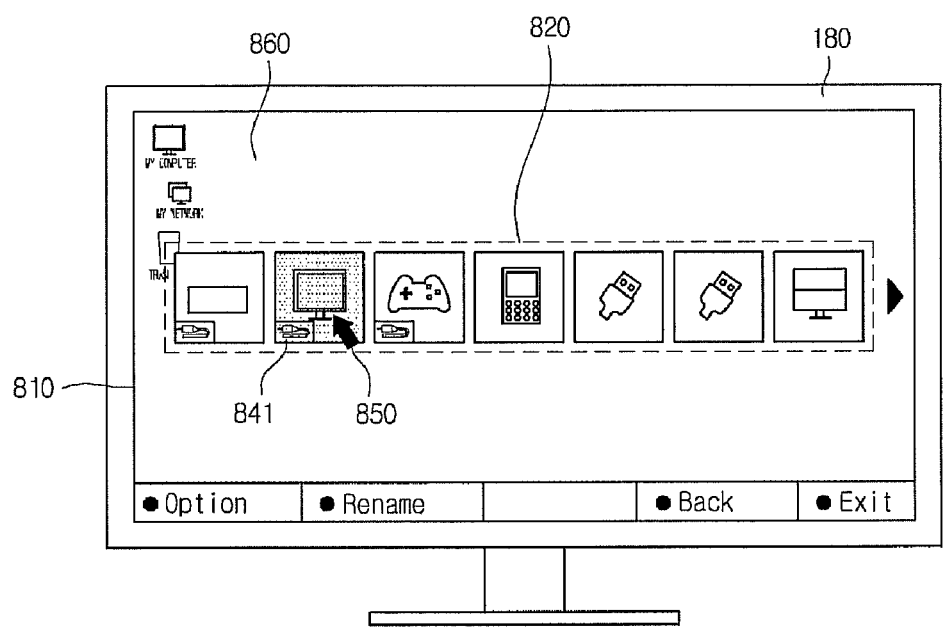
Figure 16:
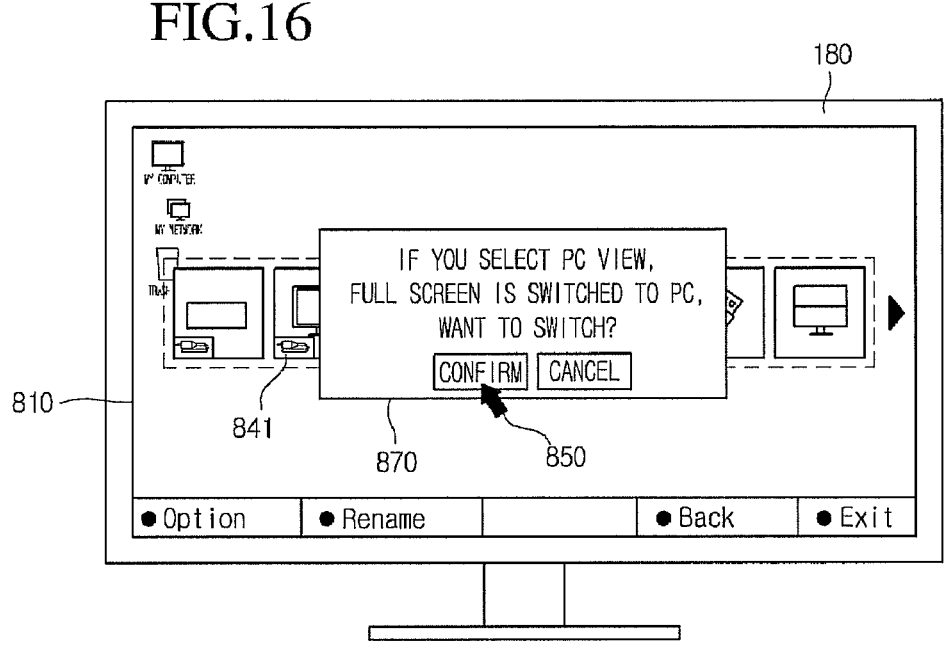

As shown in FIG. 15, when the pointer 850 is positioned on one of the plurality of external device icons 820 (for example, the second external device icon 841 representing a PC), the control unit 170 displays the image signal 860, which inputted from an external device (for example, the PC) related to the first external device icon 840 having the pointer 850 thereon, on the full screen 810 of the image display device. In this state, when an input is received to select the second external device icon 841 in operation S730, as shown in FIG. 16, a popup window 870 that asks whether to select an input switch to a PC (i.e., a second external device) is displayed on the full screen of the image display device 100.

Then, if the input switch to the external device is selected through the popup window 870, the input is switched to the PC (i.e., the second external device) in operation S740.

Figure 17:
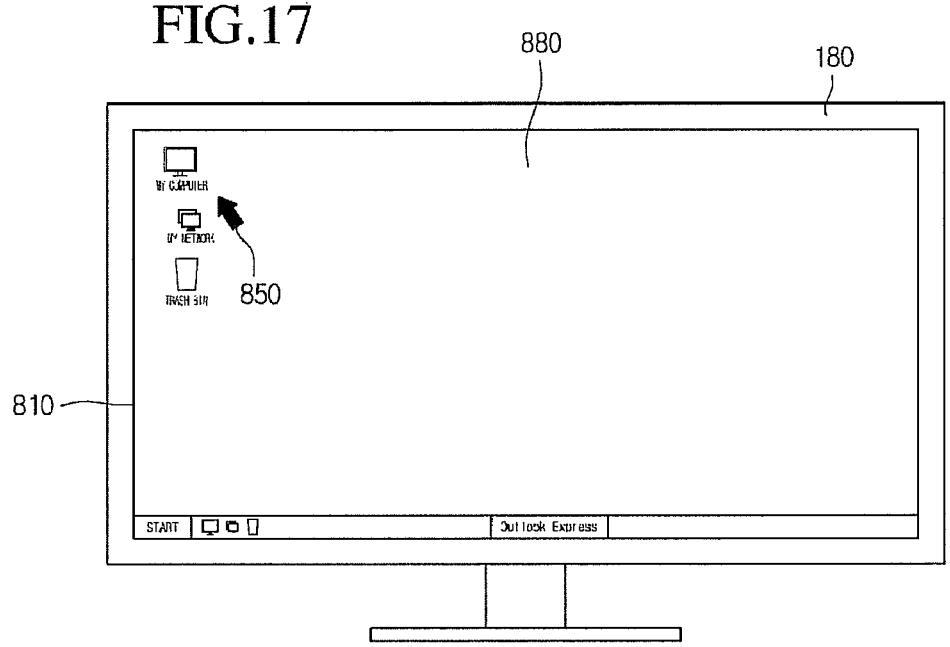

Accordingly, as shown in FIG. 17, an image signal 880 of the PC (i.e., the selected second external device) is displayed on the full screen 810 of the image display device 100.

Furthermore, the remote control device 200 that controls the image display device 100 may control the input-switched external device. This will be described in more detail.

The remote control device 200 transmits a control command for controlling an external device to the input-switched external device through the image display device 100 in operation S750. In response to the transmitted control command, a control command result of the external device is displayed on the full screen 810 of the image display device 100.

For example, as shown in FIG. 17, while the image signal 880 of the second external device is displayed on the display unit 180, in case that a control command of the remote control device 200 is transmitted to a corresponding external device, the pointer 850 displayed on the image signal 880 of the second external device may be manipulated in response to the control command.

By doing so, the remote control device 200 that controls the image display device 100 may identically control the input-switched external device, so that the user's convenience may be improved.

According to embodiments, since an image signal inputted from an external device is provided in advance before input switching, ease of use and service efficiency may be improved.

The method of providing an external device list according to the present invention may be programmed to be executed in a computer and may be stored on a computer readable recording medium. Examples of the computer readable recording medium include read-only memory (ROM), random-access memory (RAM), CD-ROMs, magnetic tapes, floppy disks, and optical data storage devices.

The computer readable recording medium can also be distributed over network coupled computer systems so that the computer readable code is stored and executed in a distributed fashion. Also, functional programs, codes, and code segments for accomplishing the present invention can be easily construed by programmers skilled in the art to which the present invention pertains.

Moreover, although the preferred embodiments of the present invention are described above, the present invention is not limited the above-mentioned specific embodiments. It will be understood by those skilled in the art that various changes in forms and details may be made therein without departing from the spirit and scope of the invention. Also, these modified embodiments should be understood without departing from the technical scope or prospect of the present invention.

What is claimed is:

1. An image display device comprising:
   a display;
   a first external interface configured to receive a first image signal input from a first external device connected to the image display device;
   a second external interface configured to receive a second image signal input from a second external device connected to the image display device; and
   a controller coupled with the display, the first external interface and the second external interface, the controller configured to:
   display a plurality of external device icons on the display, wherein the plurality of external device icons include a first external device icon corresponding to the first external device and a second external device icon corresponding the second external device, wherein a first default image identifying the first external interface is displayed on the first external device icon and a second default image identifying the second external interface is displayed on the second external device icon,
   display the first default image if the first external device is not connected to the image display device,
   change the first default image to a first image based on the first image signal in response to the first external device icon being selected if the first external device is connected to the image display device, wherein the first image is displayed at a position corresponding to an area where the first external device icon is displayed,
   display the second default image if the second external device is not connected to the image display device, and
   change the second default image to a second image based on the second image signal in response to the second external device icon being selected if the second external device is connected to the image display device, wherein the second image is displayed at a position corresponding to an area where the second external device icon is displayed.

2. The image display device according to claim 1, wherein the controller is further configured to:
   highlight the first external device icon in response to the first external device icon being selected, and
   highlight the second external device icon in response to the second external device icon being selected.

3. The image display device according to claim 1, further comprising:
   a third external interface configured to receive a third image signal input from a third external device connected to the image display device,
   wherein the controller is further configured to:
   display a third external device icon corresponding to the third external device, wherein a third default image is displayed on the third external device icon, and change the third default image to a third image based on the third image signal in response to the third external device icon being selected if the third external device is connected to the image display device.

4. The image display device according to claim 1, wherein the controller is further configured to:
transmit a control command for controlling the first external device to the first external device, and
display an execution result of the control command on the display.

5. The image display device according to claim 1, wherein the first image displayed on the first external device icon is simultaneously displayed with the plurality of external device icons while the first external device icon is selected.

6. The image display device according to claim 1, wherein the first and second external device icons are selectable via a cursor positioned on the first and second external device icons, respectively.

7. The image display device according to claim 6, wherein the cursor is controlled by a remote controller interfacing with the image display device.

8. The image display device according to claim 1, wherein the first image is displayed in place of the first external device icon.

9. The image display device according to claim 1, wherein the first default image is an image for identifying the first external interface.

10. The image display device according to claim 1, wherein the changed first image is an image which is currently displayed on the first external device, and
wherein the changed second image is an image which is currently displayed on the second external device.

11. The image display device according to claim 1, wherein the controller is further configured to display a symbol representing that the first external device or the second external device is connected to the display device.

12. The image display device according to claim 1, wherein the controller is further configured to display the first default image although first external device icon is selected if the first external device is not connected to the image display device.

* * * * *